US011428604B2

(12) United States Patent
Pons

(10) Patent No.: US 11,428,604 B2
(45) Date of Patent: Aug. 30, 2022

(54) COMPACT OPTICAL TIME DOMAIN REFLECTOMETER WITH INTEGRATED TIME DELAY FIBER WAVEGUIDE

(71) Applicant: Christine Pons, Covington, WA (US)

(72) Inventor: Sean Mitchell Pons, Kent, WA (US)

( * ) Notice: Subject to any disclaimer, the term of this patent is extended or adjusted under 35 U.S.C. 154(b) by 0 days.

(21) Appl. No.: 17/105,876

(22) Filed: Nov. 27, 2020

(65) Prior Publication Data
US 2021/0172832 A1    Jun. 10, 2021

Related U.S. Application Data

(60) Provisional application No. 62/974,539, filed on Dec. 6, 2019.

(51) Int. Cl.
*G01M 11/00* (2006.01)
*G02B 6/44* (2006.01)

(52) U.S. Cl.
CPC .... *G01M 11/3154* (2013.01); *G01M 11/3145* (2013.01); *G02B 6/444* (2013.01); *G02B 6/4457* (2013.01)

(58) Field of Classification Search
CPC . H04B 10/071; H04B 10/07; G01M 11/3145; G01M 11/3109; G01M 11/3154; G01M 11/319; G01M 11/3181; G01M 11/3118; G01M 11/3127; G01M 11/3136; G01M 11/3163; G01M 11/3172; G01M 11/31; G01D 5/35358; G01D 5/35364; B65H 57/04; B65H 57/12; B65H 2701/32; B65H 75/12; B65H 75/14; G02B 6/2861; G02B 6/3823; G02B 6/3897; G02B 6/444; G02B 6/4441; G02B 6/4442; G02B 6/4446; G02B 6/4447; G02B 6/4448; G02B 6/445; G02B 6/4457; G02B 6/4458
See application file for complete search history.

(56) References Cited

U.S. PATENT DOCUMENTS

| 2,716,008 | A | * | 8/1955 | Taylor, Jr. | B65H 49/08 242/163 |
| 4,959,540 | A | * | 9/1990 | Fan | G02B 6/2861 250/227.12 |
| 5,148,230 | A | * | 9/1992 | Lane | G01D 7/02 356/73.1 |

(Continued)

FOREIGN PATENT DOCUMENTS

| CN | 106533546 A | * | 3/2017 |
| CN | 110086528 A | * | 8/2019 |

(Continued)

*Primary Examiner* — Gordon J Stock, Jr.

(57) ABSTRACT

A compact optical time domain reflectometer (OTDR) containing a small-scale OTDR, power source, and wireless communications electronics encompassed within the confines of a spool containing a time delay fiber optic waveguide coiled about the face of the spool. Data obtained by the OTDR is transmitted by wire or wirelessly to a computer or portable wireless device for graphical plotting of said data and evaluation by the user. The integration of the time delay waveguide eliminates the need for a separate time delay waveguide and provides a more compact testing solution. The Compact OTDR with Integrated Time Delay is used to test the integrity of an optical fiber waveguide.

8 Claims, 10 Drawing Sheets

(56) References Cited

U.S. PATENT DOCUMENTS

| | | | | |
|---|---|---|---|---|
| 5,442,434 | A * | 8/1995 | Liao | G01M 11/3145 356/73.1 |
| 5,500,730 | A * | 3/1996 | Johnson | G01M 11/3109 250/227.15 |
| 5,708,500 | A * | 1/1998 | Anderson | G01M 11/3145 250/227.15 |
| 5,801,953 | A * | 9/1998 | Thoma | G01M 11/3145 324/121 R |
| 7,715,679 | B2 * | 5/2010 | Kowalczyk | G02B 6/4457 242/372 |
| 7,808,621 | B2 * | 10/2010 | Russell | H04B 10/071 356/73.1 |
| 8,711,341 | B2 * | 4/2014 | Blair | G01M 11/3136 356/73.1 |
| 9,036,137 | B2 * | 5/2015 | Goldstein | G01M 11/088 356/73.1 |
| 9,173,710 | B2 * | 11/2015 | Van Zuylen | G02B 6/4457 |
| 9,310,275 | B1 * | 4/2016 | Irving | G01M 11/39 |
| 9,411,119 | B1 * | 8/2016 | Hoofnagle | G02B 6/444 |
| 9,971,118 | B1 * | 5/2018 | Irving | G02B 6/4457 |
| 2004/0170369 | A1 * | 9/2004 | Pons | G01M 11/3109 385/135 |
| 2005/0259242 | A1 * | 11/2005 | Bridge | G01M 11/3109 356/73.1 |
| 2006/0110119 | A1 * | 5/2006 | Kline | G02B 6/4457 385/135 |
| 2006/0210230 | A1 * | 9/2006 | Kline | G02B 6/4457 385/135 |
| 2008/0129983 | A1 * | 6/2008 | Mathes | G01M 11/3145 356/73.1 |
| 2017/0299835 | A1 * | 10/2017 | Alford | B65H 75/4449 |
| 2018/0113268 | A1 * | 4/2018 | Van Baelen | G02B 6/4457 |
| 2018/0292293 | A1 * | 10/2018 | Levin | G02B 6/4457 |

FOREIGN PATENT DOCUMENTS

| | | | | |
|---|---|---|---|---|
| CN | 209400762 | U | * | 9/2019 |
| EP | 3461770 | A1 | * | 4/2019 ............ B65H 54/72 |
| JP | 2004109004 | A | * | 4/2004 |
| JP | 3599693 | B2 | * | 12/2004 |
| KR | 20060079281 | A | * | 7/2006 ............ H04B 10/07 |
| WO | WO-0026632 | A1 | * | 5/2000 ............ H04B 10/07 |

* cited by examiner

COMPACT OPTICAL TIME DOMAIN REFLECTOMETER WITH INTEGRATED TIME DELAY FIBER WAVEGUIDE

CROSS-REFERENCE TO RELATED APPLICATIONS

This application claims priority benefit to U.S. Provisional Application No. U.S. 62/974,539 filed Dec. 6, 2019, which is incorporated herein by reference in its entirety.

BACKGROUND OF THE INVENTION

1. Field of the Invention

The invention relates to an optical time domain reflectometer with an integrated time delay fiber optic waveguide. The invention provides a method of testing the integrity of an optical fiber in a given laboratory, field, production, residential home, educational institution, commercial, or industrial environment. The optical time domain reflectometer can typically measure the optical fiber waveguide length, provide the location of bends, breaks, splices, connection points, natural loss of a given optical waveguide, continuity, identification, network traffic presence, reflectance, and optical return loss. This concept may be further extended or combined with other pieces of optical test equipment such as power meters, light sources, spectrum analyzers, polarity testers, visual microscopes, and other similar optical test devices.

2. Description of Related Art

Optical time domain reflectometers (OTDRs) are common instruments used in the qualification, inspection, certification, troubleshooting, and monitoring of fiber optic waveguides as they have the ability to measure decibel loss of optical connectors or components, reflective properties of connectors or components, the intrinsic loss of the fiber waveguide, measure length, identify bends, breaks, and continuity. This is made possible through the transmission of a laser pulse propagating down the core of an optical fiber waveguide and subsequently measuring the reflected power returning into the OTDR via an avalanche photo diode (APD) in the form of Fresnel reflections and Rayleigh backscattering. The returned power is commonly plotted in an electronic graphical form with power being shown over time or distance. A user of an OTDR can then evaluate the integrity of the optical fiber waveguide against known industry standards or specific requirements by observing the plot representing the optical fiber waveguide. An OTDR only require access to one end of an optical system under test.

OTDRs are frequently used in conjunction with an optical fiber waveguide connected between the OTDR and the fiber optic system under test. This optical fiber waveguide, commonly known as a Time Delay, Fiber Box, Test Fiber Box, Launch Cord, Launch Fiber, Pulse Suppressor, or Lead-In Box is commonly a span of an optical fiber ranging from 20 to 5000-meters and coiled to conserve space, packaged in a protective enclosure, and terminated with optical connectors. The OTDR and Test Fiber Box are most often two separate units.

The purpose of the time delay optical fiber waveguide is to increase the optical waveguide distance between the OTDR and the system under test so that the initial connection point of the system under test can be accurately measured and evaluated. Without the time delay waveguide, the proximity of the initial connection point of the system under test and the OTDR avalanche photo diode (APD) can be too close together and subsequently cause the OTDR to attempt to measure initial system under test connection while the APD is in saturation, which is the device attempting to operate outside of its useful parameters. Therefore, the time delay optical fiber waveguide increases the distance between the OTDR APD and the first connection point of the optical system under test to allow the OTDR APD to exit saturation and resume useful and accurate measurements.

BRIEF SUMMARY OF THE INVENTION

A compact optical time domain reflectometer (OTDR) containing a small-scale OTDR, power source, and wireless communications electronics is encompassed within the confines of a circular spool containing a time delay optical fiber waveguide coiled about the outer face of a spool. The time delay fiber waveguide is a continuous, optical fiber existing between the interfacing optical connector and the OTDR. This provides a time delay between the OTDR and the beginning of the external optical system under test in which it will attempt to test for the purpose of improving measurement accuracy of the first connector in the optical system under test. The optical fiber waveguide is a span of optical fiber wrapped about the surface of a spool and terminates at the OTDR apparatus via a slot in the spool's inner surface. The optical fiber waveguide coiled on the spool is protected by a security channel to allow the end of the optical fiber waveguide to exit the spool. The fragility of the exiting span of optical fiber waveguide is protected by adding a cable jacket to the optical fiber waveguide with tubing containing a strength member. The strength member, typically an aramid yarn, and tubing are connected to the security channel by epoxy or other mechanical means and the end is terminated with an optical connector for connection to an external fiber optic system. The spool housing containing coiled fiber waveguide, the OTDR, power source, and wireless electronics are housed in a protective enclosure. Data obtained by the OTDR is transmitted by wire or wirelessly to a computer or portable wireless device for graphical plotting of data and evaluation by the user. The Compact OTDR with Integrated Time Delay is used to test the integrity of an optical fiber waveguide.

DETAILED DESCRIPTION

Figure 1:
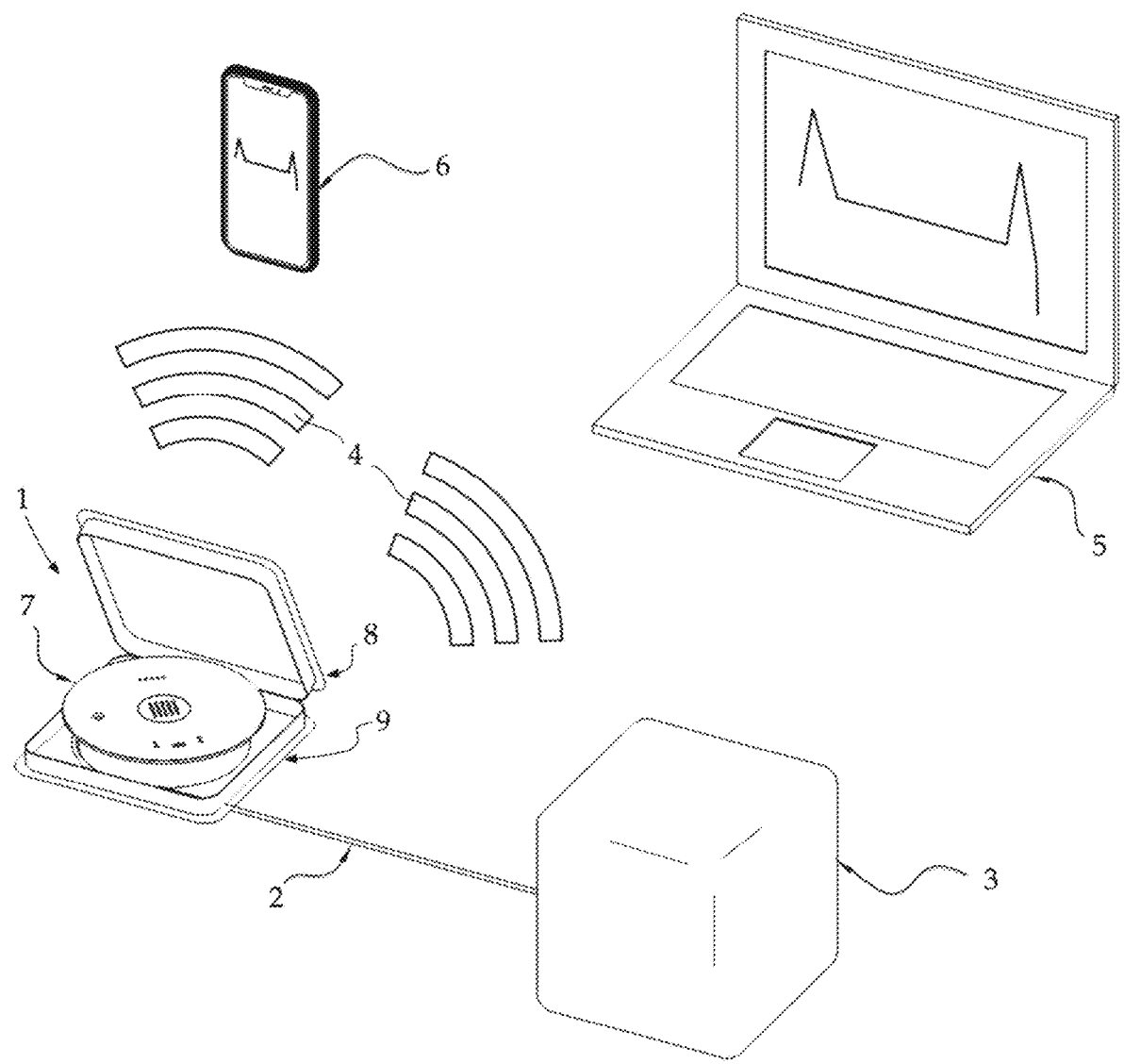
FIG. 1 is a view of an OTDR with time delay optical fiber waveguide wireless communication with external computer and wireless mobile device connected to an optical network under test.
Figure 2:
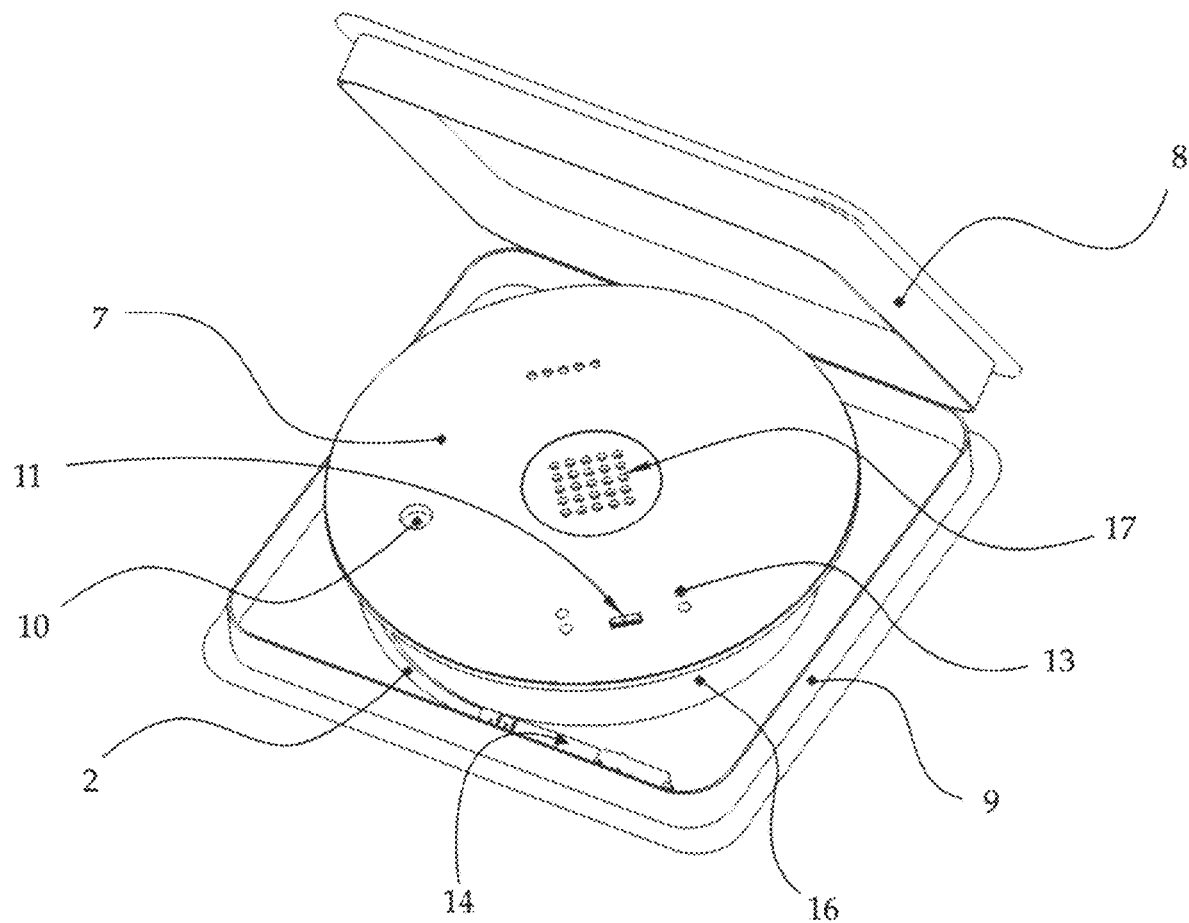
FIG. 2 is an isometric top view of the OTDR with time delay optical fiber waveguide in clamshell-style protective case.
Figure 3:
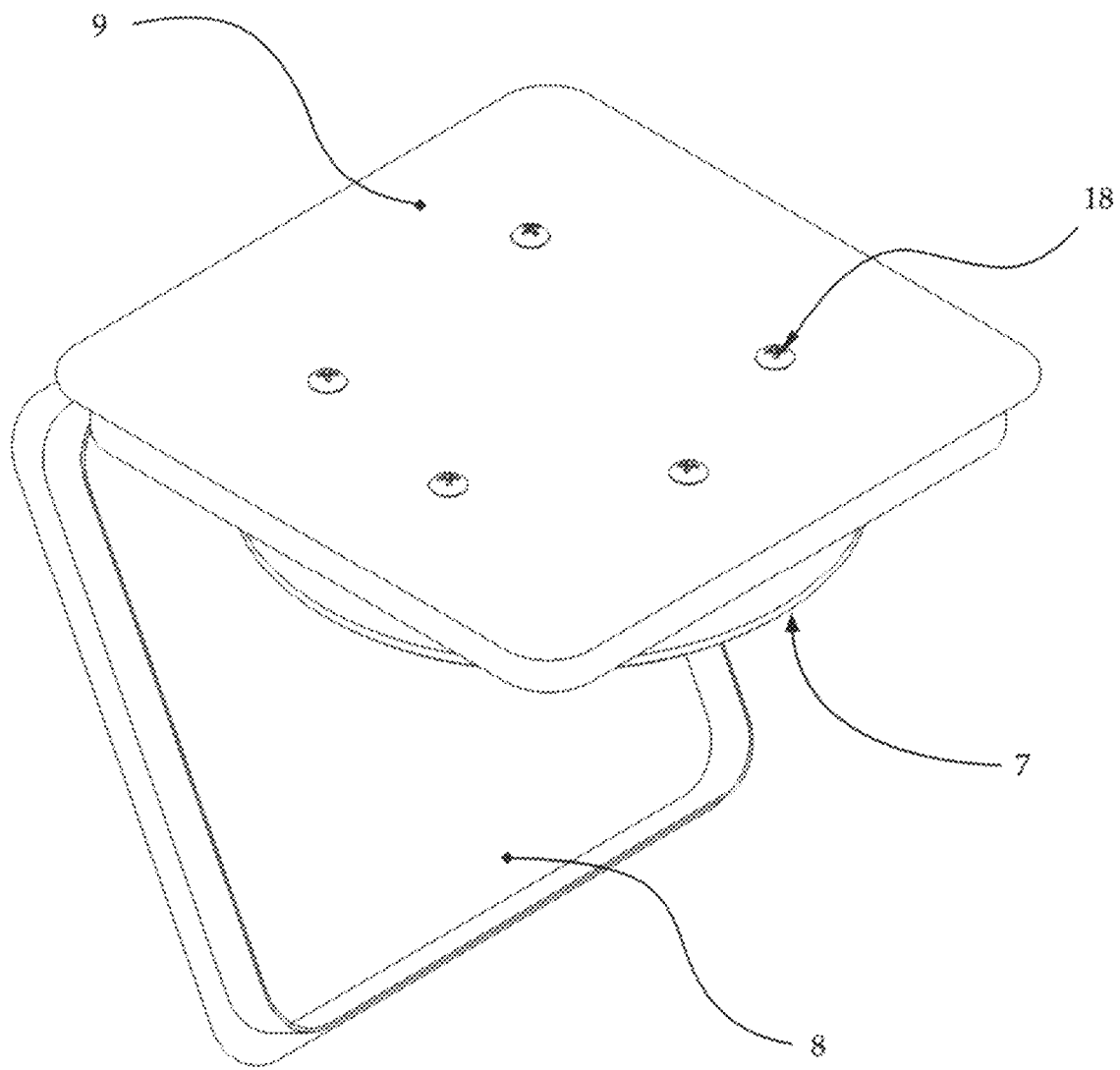
FIG. 3 is an isometric bottom view of the OTDR with time delay optical fiber waveguide in clamshell-style protective case.
Figure 4:
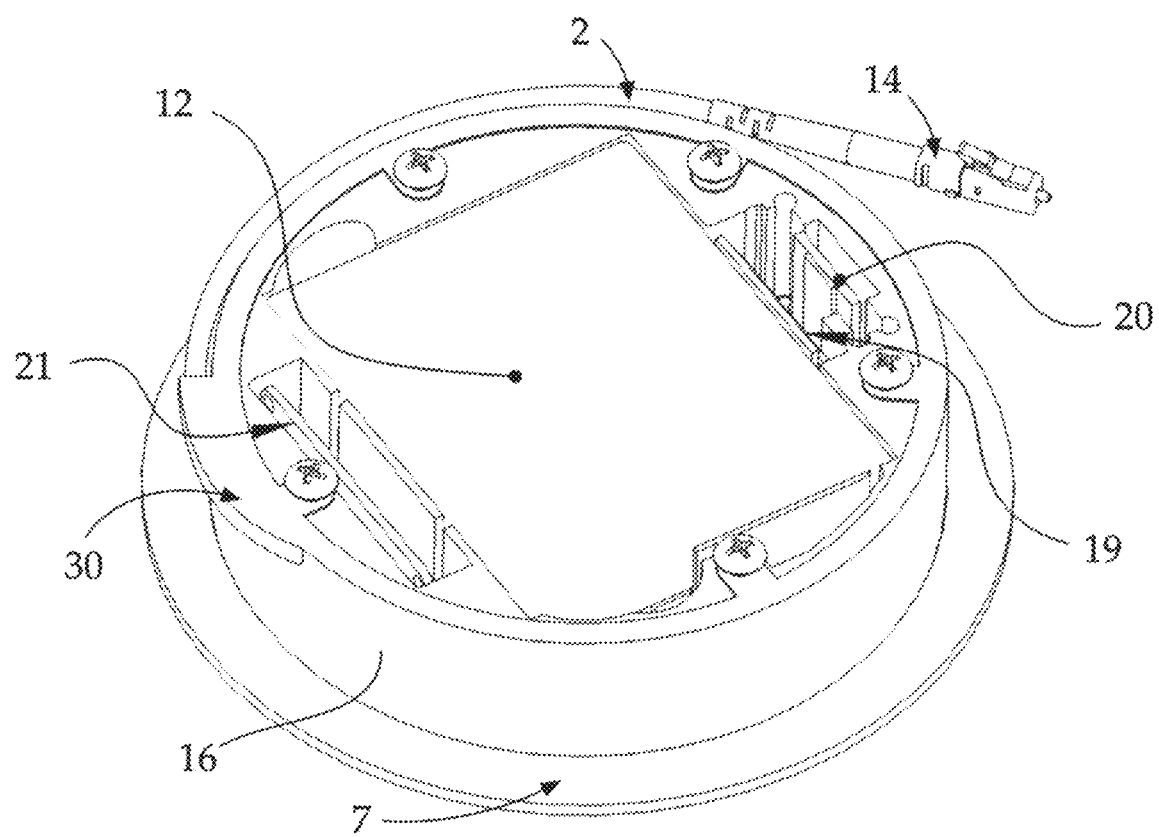
FIG. 4 is an isometric bottom view showing the battery, power supply, and battery charger with the clamshell-style protective case removed.
Figure 5:
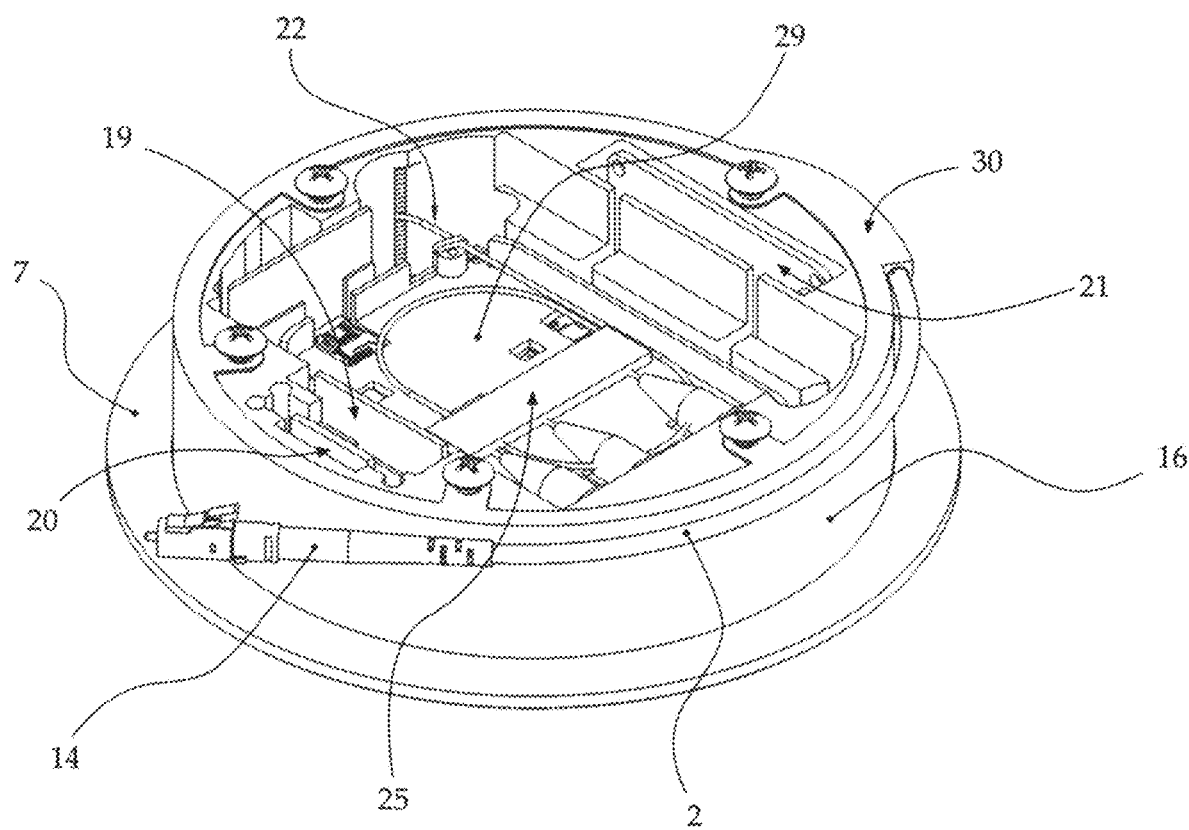
FIG. 5 is a bottom view with the battery and clamshell-style protective case removed.
Figure 6:
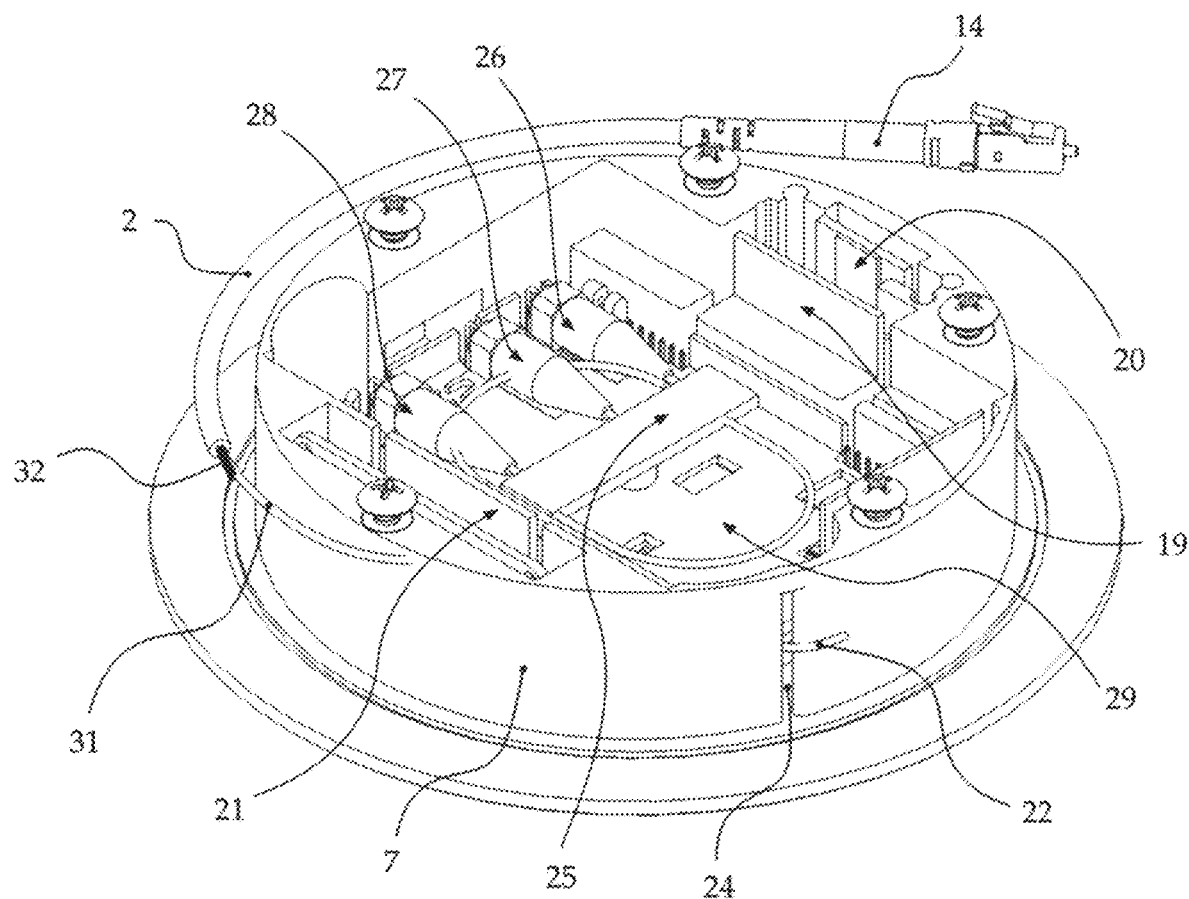
FIG. 6 is a view of the optical fiber waveguide entrance and exit points with spooled waveguide hidden.
Figure 7:
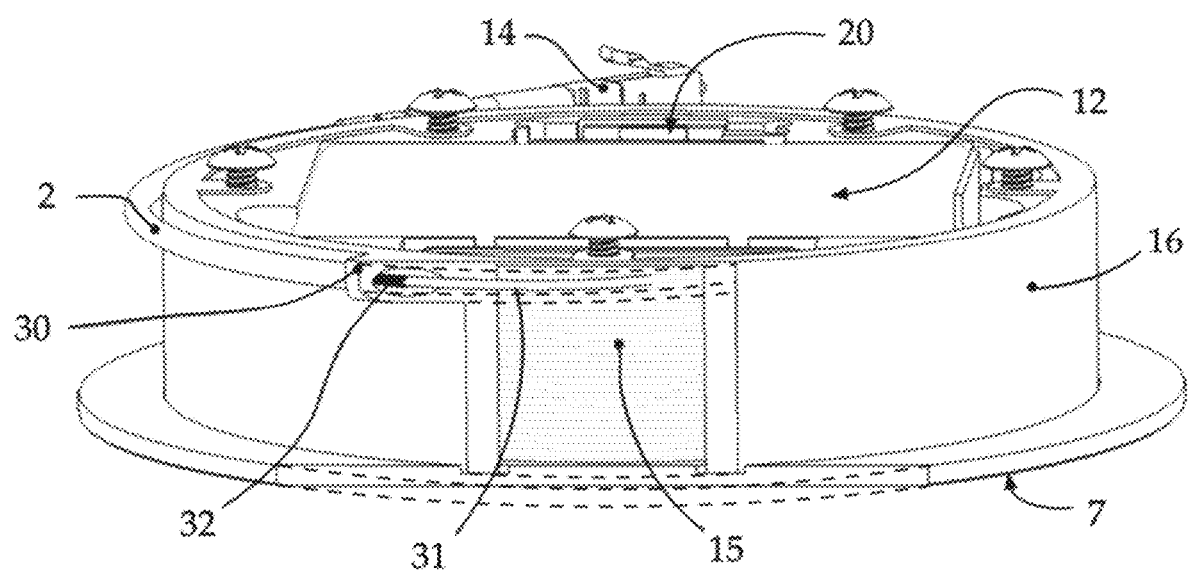
FIG. 7 is a cut-away view of optical fiber waveguide security cavity and protective cover exposing the spooled time delay fiber waveguide.
Figure 8:
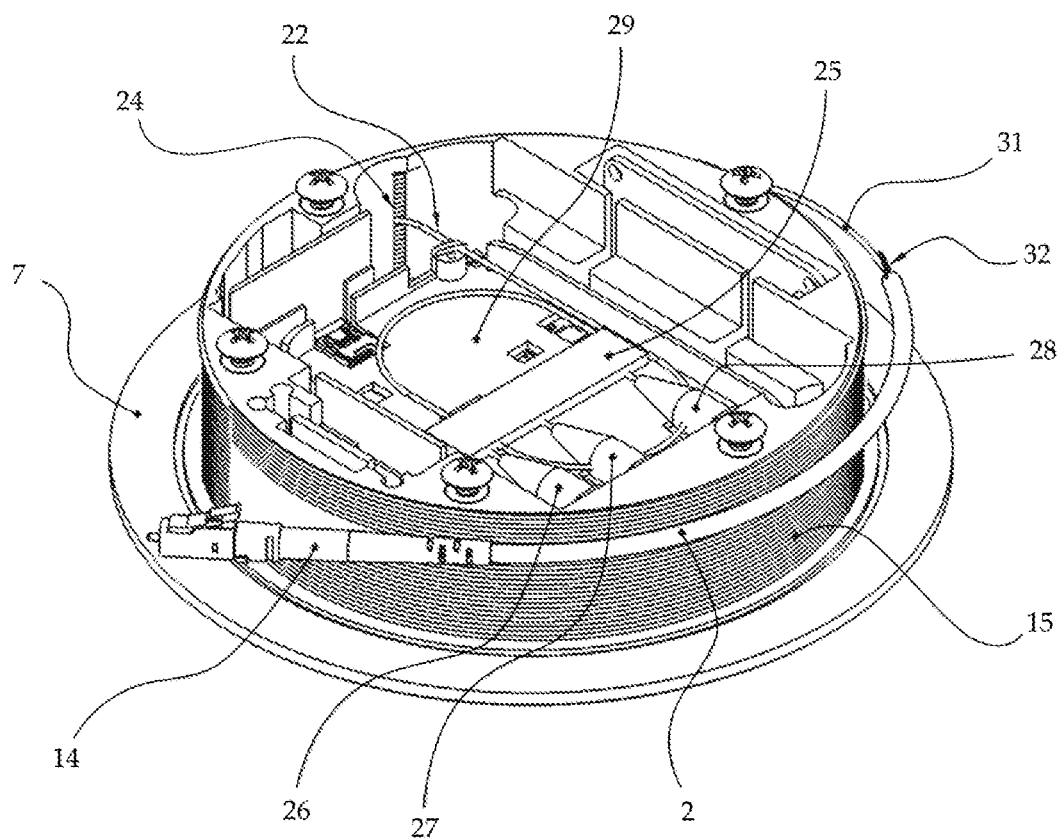
FIG. 8 is a bottom view with protective optical fiber waveguide cover and battery hidden.
Figure 9:
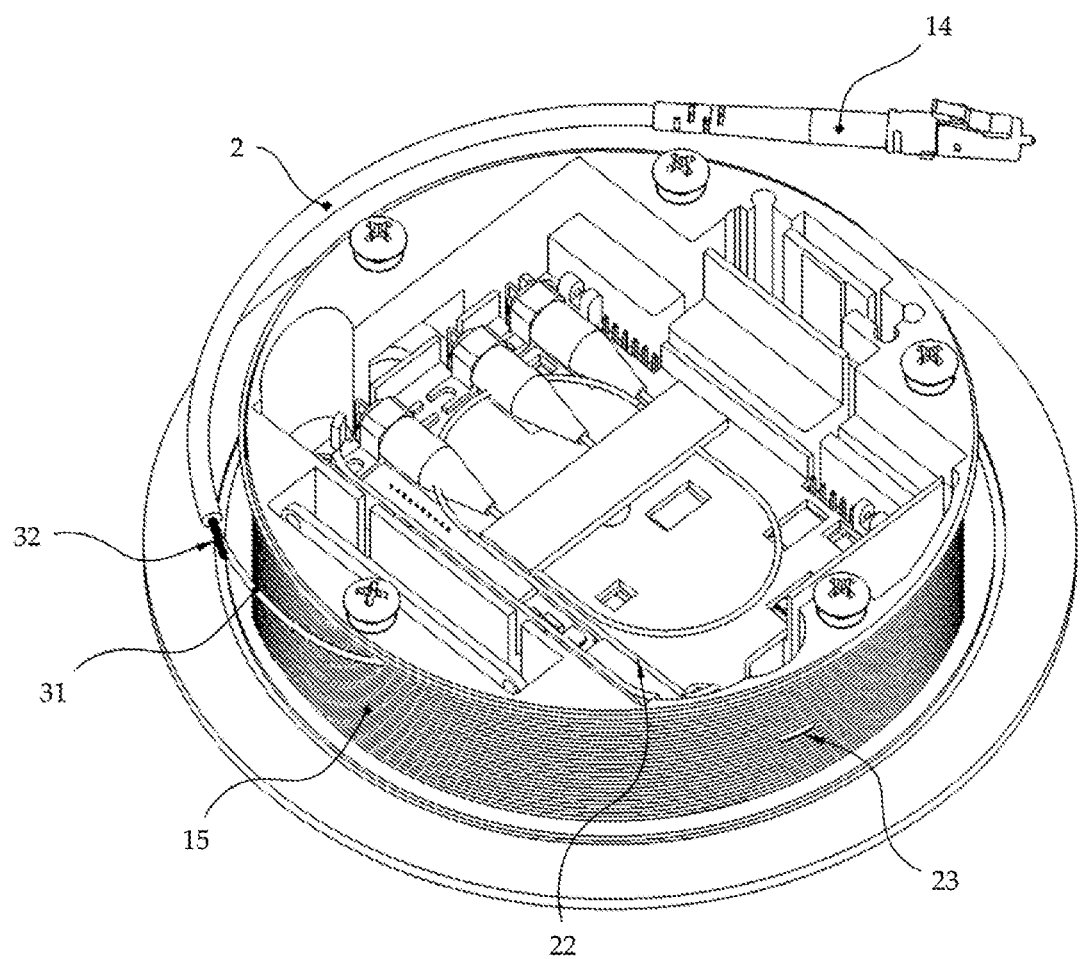
FIG. 9 is a bottom view showing the optical fiber waveguide entrance and exit points with spooled optical fiber waveguide shown.
Figure 10:
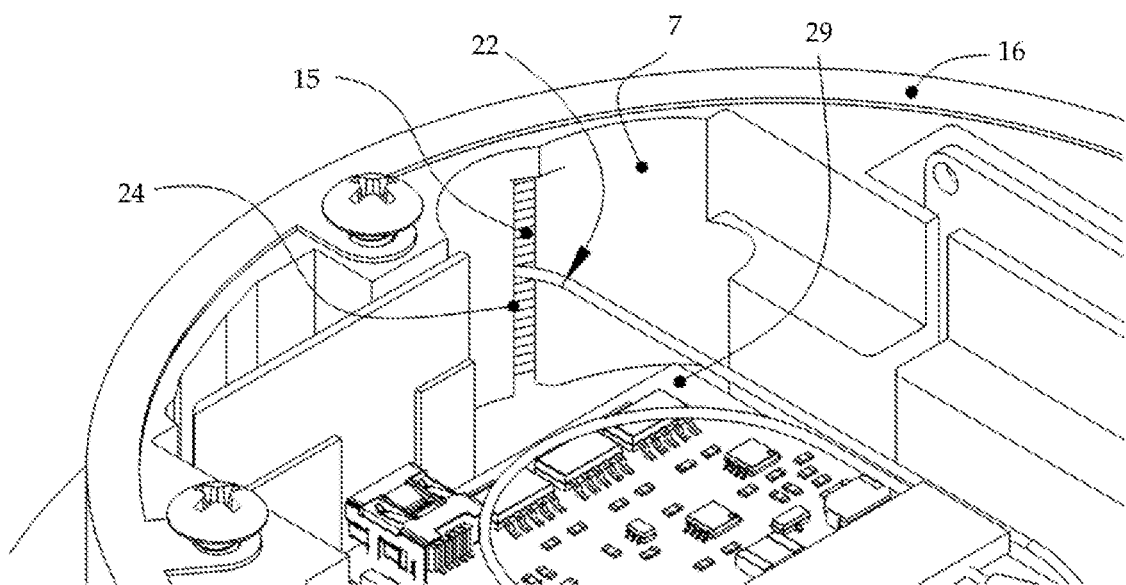
FIG. 10 is a bottom view showing optical fiber waveguide exiting OTDR through exit slot for the time delay fiber waveguide.

The OTDR with time delay optical fiber waveguide in clamshell-style enclosure 1 is connected via jacketed optical cable 2 to an external optical network 3 and used to test, analyze, calibrate, evaluate, troubleshoot, and monitor the integrity of the optical fiber waveguide in said external network. Received signals and data are then transmitted by wire or wireless radio signal 4 to a computer 5 or mobile wireless device 6 or other type of electronic display. Software on the computer 5 or mobile wireless device 6 then projects the data in plotted or numerical form on the given device. The data can be processed and analyzed as needed by the user.

The OTDR with time delay optical fiber waveguide 7 can be housed in a variety of enclosure styles, such as a clamshell-style protective case 8 and 9 that measures approximately 6-inches by 6-inches by 1 ½-inches. The clamshell-style protective case (top) 8 can be partially separated from the clamshell-style protective case (bottom) 9 to expose the OTDR with time delay optical fiber waveguide 7. This allows access to the power switch 10 for the purpose of turning the unit on and off, the power & communications port 11 used for wired communications and to charge the internal battery 12, the indictor lamps 13 to show the status of power, battery charge, and wireless signal, the jacketed optical cable 2 and optical connector 14 that contains approximately the last 1-meter of the spooled optical fiber waveguide 15 to be connected to the external optical network 3. The optical connector 14 is connected to a compatible connector on the external optical network 3. The approximately last 1-meter of the spooled optical launch waveguide 15 contained within the jacketed optical cable 2 and terminated with the optical connector 14 can be manually wound around the outer parameter of the protective optical fiber waveguide cover 16 when not in use for storage purposes. The heat exhaust vent 17 allows a method for keeping the electronics within the OTDR with time delay optical fiber waveguide 7 from overheating.

The OTDR with time delay optical fiber waveguide 7 is attached to an enclosure, such as a clamshell-style protective case 8 and 9 with a series of securing fasteners 18. The securing fasteners also prevent the protective optical fiber waveguide cover 16 from rotating and protect the optical fiber waveguide from stress and damage.

Exposing the interior of the apparatus reveals: the battery 12 used to power the OTDR with time delay optical fiber waveguide 7, the power supply 19 used to provide specific power levels to the apparatus, the battery charger and protection circuitry 20 used to recharge the battery and to provide over-current, over-voltage, under-voltage, and thermal protection, and the communications radio 21 used to send data via wireless radio signal 4 from the OTDR with time delay optical fiber waveguide 7 to the computer 5 or mobile wireless device 6.

The outer cylindrical shell of the OTDR with time delay optical fiber waveguide 7 has a diameter of about 4-inches and this surface contains the spooled optical fiber waveguide 15 with a length of up to 1000-meters. The near side 22 of the spooled optical fiber waveguide 15 enters the interior of the OTDR with time delay optical fiber waveguide 7 at the entry point for near end of time delay optical fiber waveguide 23 through an exit slot for the time delay optical fiber waveguide 24. The near side 22 of the spooled optical fiber waveguide 15 enters the optical coupler assembly 25 where the waveguide is split and then routed to a laser 26, optionally to a second laser 27, and to an avalanche photo diode 28 that are mounted on the optical time domain reflectometer 29.

The far side of the spooled optical fiber waveguide 15 enters an optical fiber waveguide security cavity 30 in the protective optical fiber waveguide cover 16 at a transition point for the far end of the time delay optical fiber waveguide 31 where a jacketed optical cable tube 2 containing aramid yarn 32 is permanently attached. This attachment between the optical fiber waveguide security cavity 30 in the protective optical fiber waveguide cover 16 and the jacketed optical cable tube 2 containing aramid yarn 32 is typically achieved with epoxy or by mechanical means and provides strain relieve for the exiting spooled optical fiber waveguide 15. The far side of the spooled optical fiber waveguide 15 travels approximately 1-meter through the jacketed optical cable 2 and terminates at the optical connector 14.

In an exemplary embodiment of the invention, the approximately 1-meter of jacketed optical cable 2 attached to the OTDR with time delay optical fiber waveguide 7 is unwound from the OTDR with time delay waveguide 7 and connected via jacketed optical cable 2 to the external optical network 3. An operator would set a number of parameters and attributes on a computer control 5, mobile wireless device 6, or other similar apparatus and initiate the test via software control. The communication between the computer control 5, mobile wireless device 6, or other similar apparatus and the OTDR with time delay optical fiber waveguide 7 is made by wire or by wireless radio signal 4 and the signals tell the OTDR 29 to transmit a series of photonic pulses from one laser 26 or a second laser 27 in a specified pattern. The photonic pulses travel through the optical coupler assembly 25 and into the optical fiber waveguide entry point 23. The photonic pulses travel through the spooled optical fiber waveguide 15 and exit the OTDR with time delay optical fiber waveguide 7 at the optical connector 14. The photonic pulses then enter the connection 2 and into the external optical network 3. The reflected optical power then returns in the opposite direction and to the OTDR 29 via an avalanche photo diode 28 in the form of Fresnel reflections and Rayleigh backscattering. The collected data is then sent from the OTDR with time delay optical fiber waveguide 7 to the computer 5, mobile wireless device 6, or other similar apparatus via wire or by wireless radio signal 4 where the user can analyze the returned test data.

Improvements Over Prior Art

The OTDR with time delay optical fiber waveguide improves prior art in a number of ways. First, said invention integrates the OTDR into the optical time delay optical fiber waveguide as single unit as opposed to having two separate units to reduce weight, size, cost, and to improve simplicity of operation. The entire OTDR with time delay optical fiber waveguide in clamshell-style enclosure is approximately same size of a traditional existing 6-inch by 6-inch by 1

½-inch time delay optical fiber waveguide without OTDR, thus making the greatest use of the space within a similar enclosure.

Second, traditional optical time delay fiber waveguides have two connection points: one to the OTDR and one to the network under test. The said invention eliminates the near end connection to the OTDR by permanently integrating the time delay waveguide into the OTDR optics that include the couplers, lasers, and the APD. This makes the device easier to use by eliminating one connection point through integration and reduces the future need to maintain and repair this particular connection point.

Third, the said invention encapsulates the OTDR, electronics, power supply, battery, wireless radio, battery charger all within the coiled parameter of the time delay optical fiber waveguide which, in an exemplary embodiment, is approximately 4-inches in diameter and a height of I-inch. This makes use of space that would otherwise and traditionally be unused or limited in use.

Fourth, manufacturability and cost of the said invention is improved by using the shell of the OTDR with time delay optical fiber waveguide as a fixture to coil the optical fiber waveguide upon. This can reduce both labor and materials since the optical fiber waveguide permanently remains on the spool and the rest of the components are placed in or about the spool housing.

Fifth, the approximately I-meter jacketed optical cable and optical connector containing the far end of the time delay waveguide is conveniently managed by wrapping said cable around the outer parameter of the apparatus.

Sixth, a protective cover isolates the fragile time delay optical fiber waveguide from exterior forces and contains a small-scale cavity for providing strain relief to the delicate optical fiber waveguide within the jacketed optical cable. This increases the longevity of the user-facing connection point.

LIST OF DRAWING ANNOTATIONS

1. OTDR with Time Delay Optical Fiber Waveguide in Clamshell Enclosure
2. Jacketed Optical Cable
3. External Optical Network
4. Wireless Radio Signal
5. Computer
6. Mobile Wireless Device
7. OTDR with Time Delay Optical Fiber Waveguide Assembly
8. Clamshell-Style Protective Case (top)
9. Clamshell-Style Protective Case (bottom)
10. Power Switch
11. Power & Communications Port
12. Battery
13. Indicator Lights
14. Optical Connector
15. Spooled Time Delay Optical Fiber Waveguide
16. Protective Optical Fiber Waveguide Cover
17. Heat Exhaust Vent
18. Securing Fasteners
19. Power Supply
20. Battery Charger and Protection Circuitry
21. Communications Radio
22. Near End of Time Delay Optical Fiber Waveguide
23. Entry Point for Near End of Time Delay Optical Fiber Waveguide
24. Exit Slot for Time Delay Optical Fiber Waveguide
25. Optical Coupler Assembly
26. Laser 1
27. Laser 2
28. Avalanche Photo Diode
29. Optical Time Domain Reflectometer
30. Optical Fiber Waveguide Security Cavity
31. Transition Point for Far End of Time Delay Optical Fiber Waveguide
32. Aramid Yarn The embodiments of the invention in which an exclusive property or privilege is claimed are defined as follows:

1. An apparatus, comprising:
    an optical time domain reflectometer (OTDR) comprising optics comprising a splitter, at least one laser, and an avalanche photo diode;
    a time delay optical fiber waveguide comprising a continuous span of optical fiber having a distal end comprising an optical connector and a proximal end that is integrated into the optics of the OTDR, with no mechanical or optical interfaces between the distal end of the optical fiber and the OTDR;
    a spool housing having an outer surface forming a first cylindrical spool around which a first portion of the continuous span of optical fiber is wrapped, encompassing the OTDR, which is disposed within the spool housing; and
    a protective cover surrounding the first cylindrical spool and the first portion of the continuous span of optical fiber, the protective cover having a protective channel extending from an inner surface of the protective cover to an outer surface of the protective cover, the outer surface of the protective cover forming a second cylindrical spool, substantially concentric with the first cylindrical spool, around which to coil a second portion of the continuous span of optical fiber that extends through the protective channel,
    wherein the protective channel comprises a protective structure that surrounds at least a portion of the second portion of the continuous span of optical fiber on the outer surface of the second cylindrical spool, and wherein the protective cover and protective structure comprise a single, unitary part.

2. The apparatus of claim 1, wherein the protective structure further comprises a mounting point for a flexible tube that surrounds the second portion of the continuous span of optical fiber from an end of the protective structure to the optical connector.

3. The apparatus of claim 1, further comprising a power supply, a battery charger and protection circuitry, and a battery, all disposed within the spool housing and encompassed by the first portion of the continuous span of optical fiber.

4. An apparatus, comprising:
    a spool housing for a time delay optical fiber waveguide and optical time domain reflectometer (OTDR), the spool housing comprising:
    an outer surface forming a first cylindrical spool around which to coil a first portion of a time delay optical fiber waveguide;
    an inner cavity, encompassed by the first cylindrical spool, for accepting an OTDR; and
    a protective cover surrounding the first cylindrical spool, the protective cover having a protective channel extending from an inner surface of the protective cover to an outer surface of the protective cover, the outer surface of the protective cover forming a second cylindrical spool, substantially concentric with the first cylindrical spool, around which to coil a second portion of a time delay optical fiber waveguide, wherein the protective channel comprises a protective structure that surrounds at least a portion of the protective channel on the outer surface of the second cylindrical spool, and wherein the protective cover and protective structure comprise a single, unitary part.

5. The apparatus of claim 4, wherein the protective structure further comprises a mounting point for a flexible tube for surrounding the second portion of a time delay optical fiber waveguide.

6. The apparatus of claim 4, further comprising the OTDR and the time delay optical fiber waveguide.

7. An apparatus, comprising:

a spool housing for a time delay optical fiber waveguide and optical time domain reflectometer (OTDR), the spool housing comprising an outer surface forming a first cylindrical spool around which to coil a first portion of a time delay optical fiber waveguide; and a protective cover surrounding the first cylindrical spool, the protective cover having a protective channel extending from an inner surface of the protective cover to an outer surface of the protective cover, the outer surface of the protective cover forming a second cylindrical spool, substantially concentric with the first cylindrical spool, around which to coil a second portion of a time delay optical fiber waveguide, wherein the protective channel comprises a protective structure that surrounds at least a portion of the second portion of a time delay optical fiber waveguide on the outer surface of the second cylindrical spool, and wherein the protective cover and protective structure comprise a single, unitary part.

8. The apparatus of claim 7, further comprising the OTDR and the time delay optical fiber waveguide.

* * * * *